United States Patent
Dobie et al.

(10) Patent No.: US 6,905,602 B1
(45) Date of Patent: Jun. 14, 2005

(54) METHOD AND APPARATUS TO ENHANCE DENITRIFICATION OF EFFLUENT

(76) Inventors: Keith Dobie, 128 Central Ave., Humarock, MA (US) 02047; Philip B. Pedros, 49 Fairmont Ave., Wakefield, MA (US) 01880

( * ) Notice: Subject to any disclaimer, the term of this patent is extended or adjusted under 35 U.S.C. 154(b) by 6 days.

(21) Appl. No.: 10/648,998

(22) Filed: Aug. 27, 2003

Related U.S. Application Data

(60) Provisional application No. 60/406,863, filed on Aug. 29, 2002.

(51) Int. Cl.[7] .................................................. C02F 3/30
(52) U.S. Cl. ........................ 210/605; 210/615; 210/151; 210/195.1; 210/532.2; 210/903
(58) Field of Search ................................ 210/605, 615, 210/630, 150, 151, 532.2, 923, 195.1

(56) References Cited

U.S. PATENT DOCUMENTS

| | | | |
|---|---|---|---|
| 3,617,541 A | 11/1971 | Pan | |
| 4,169,050 A | * 9/1979 | Serfling et al. | 210/150 |
| 4,279,753 A | 7/1981 | Nielson et al. | |
| 4,294,694 A | * 10/1981 | Coulthard | 210/150 |
| 4,929,484 A | 5/1990 | Basse | |
| 5,085,766 A | 2/1992 | Born | |
| 5,399,266 A | * 3/1995 | Hasegawa et al. | 210/615 |
| 5,468,392 A | * 11/1995 | Hanson et al. | 210/615 |
| 5,609,754 A | * 3/1997 | Stuth | 210/532.2 |
| 5,620,602 A | * 4/1997 | Stuth | 210/532.2 |
| 5,997,735 A | * 12/1999 | Gorton | 210/151 |
| 5,997,972 A | 12/1999 | Basse | |
| 6,183,643 B1 | 2/2001 | Goodley | |
| 6,372,137 B1 | 4/2002 | Bounds | |
| 6,540,920 B2 | * 4/2003 | Bounds et al. | 210/532.2 |
| 6,554,996 B1 | * 4/2003 | Rebori | 210/151 |

* cited by examiner

*Primary Examiner*—Christopher Upton
(74) *Attorney, Agent, or Firm*—John P. McGonagle

(57) ABSTRACT

A media used in conjunction with any system than is comprised at least of a septic or anoxic tank followed by an aerobic or alternating aerobic/anoxic treatment unit that is providing nitrification. The media enhances denitrification of effluent that has been recycled from the nitrification unit to the anoxic tank. The is comprised of a number of synthetic cords with a specific gravity less than the specific gravity of the effluent. The cords are attached to the bottom of the septic or anoxic tank. The cords will float in the liquid flow stream of the septic/anoxic tank providing a number of surfaces for fixed film organisms.

12 Claims, 1 Drawing Sheet

_US 6,905,602 B1_

METHOD AND APPARATUS TO ENHANCE DENITRIFICATION OF EFFLUENT

CROSS-REFERENCE TO RELATED APPLICATIONS

Applicants claim the priority benefits of U.S. Provisional Patent Application No. 60/406,863, filed Aug. 29, 2002.

BACKGROUND OF THE INVENTION

This invention relates to septic and anoxic tanks, and in particular, to a media added to said tanks to enhance denitrification of effluent.

A septic tank, also termed an anoxic tank, typically provides primary treatment for domestic wastewater where municipal treatment facilities are unavailable. In a conventionally operated septic tank, raw untreated sewage wastewater having a significant concentration of waste solids is introduced into the tank from an adjacent building. In the septic tank, solids separate from the liquid portion of the sewage. Solids having a lower density than the liquid move to the top of the liquid to form a scum layer, and solids having a higher density than the liquid sink to the bottom of the tank to form a sludge layer, resulting in a relatively clear liquid layer between the scum and the sludge. The liquid portion of the wastewater, which exits the discharge end of the tank by means of gravity, a pump, or a siphon, is the septic tank effluent. The quality of the septic tank effluent is generally measured by the biochemical oxygen demand (BOD), total suspended solids (TSS), and total nitrogen present in the effluent. The solids are periodically removed by having the tank pumped out and disposed in a facility specifically designed for solid disposal. Without secondary treatment, the septic tank effluent directly enters a drain field from which it is dispersed by percolation into the surrounding soil, with a certain amount of aerobic conversion taking place at this point. The effluent then migrates through the soil into the ground water, or sometimes into adjacent surface water, such as a stream or lake.

Nitrogen in raw untreated wastewater is primarily organic nitrogen combined in proteinaceous material and urea. Decomposition of the organic material by bacteria present in the anaerobic environment of the septic tank changes the organic nitrogen to ammonia nitrogen. Thus, in conventionally treated septic tank effluent, nitrogen is present primarily as ammonia nitrogen.

It has become more common now to provide secondary treatment of the septic tank effluent before disposing of the effluent in a drain field. Secondary treatment of septic tank effluent is typically an aerobic treatment. In addition to its reduction of BOD and TSS, the aerobic environment of secondary treatment causes bacteria to oxidize ammonia nitrogen to nitrate nitrogen, a process known as nitrification. Thus, in a conventional system, nitrogen in the secondary treatment effluent is primarily nitrate nitrogen. The secondary treatment effluent is recycled back to the septic tank. However, the nitrogen content of the secondary treatment effluent is still often unacceptable. It is desirable to minimize the nitrate concentration of the secondary effluent to about 10 mg-N/L, which is the nitrate concentration allowed by the U.S. EPA drinking water standards before disposing it into a drain field.

In order to remove nitrogen from the system, it is desirable to convert nitrate nitrogen to a readily removable gaseous form of nitrogen. This conversion can be accomplished biologically under anoxic (without oxygen) or anaerobic conditions by several genera of denitrifying bacteria. Denitrifying bacteria are capable of converting nitrate to nitrite, followed by production of nitric oxide, nitrous oxide and nitrogen gas. The latter three compounds are gaseous products that are released to the atmosphere and are thus removed from the system. The conversion is known as denitrification.

SUMMARY OF THE INVENTION

The present invention provides a media within the septic tank to enhance the denitrification of effluent. The instant invention is used in conjunction with any system than is comprised at least of a septic or anoxic tank followed by an aerobic or alternating aerobic/anoxic treatment unit that is providing nitrification. The purpose of the invention is to enhance denitrification of effluent that has been recycled from the nitrification unit —or down stream of the nitrification unit—to the anoxic tank.

The invention media is comprised of a number of synthetic cords with a specific gravity less than 1, i.e., the specific gravity of the effluent. The cords are attached to the bottom of the septic or anoxic tank. Because of their specific gravity, the cords will float in the liquid flow stream of the septic/anoxic tank providing a number of surfaces for fixed film organisms. Denitrification is accomplished by the microbial population, i.e., denitrifying bacteria, of the fixed film organisms attached to the cords. This allows a significantly larger microbial population to be in contact with the waste stream than would occur in a standard septic/anoxic tank. The increased biomass results in a decrease in the food-to-microorganism ratio.

An additional benefit of the invention media is that the media provides a baffle effect in the septic/anoxic tank without creating hydraulic updraft currents normally associated with solid baffles.

These together with other objects of the invention, along with various features of novelty which characterize the invention, are pointed out with particularity in this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
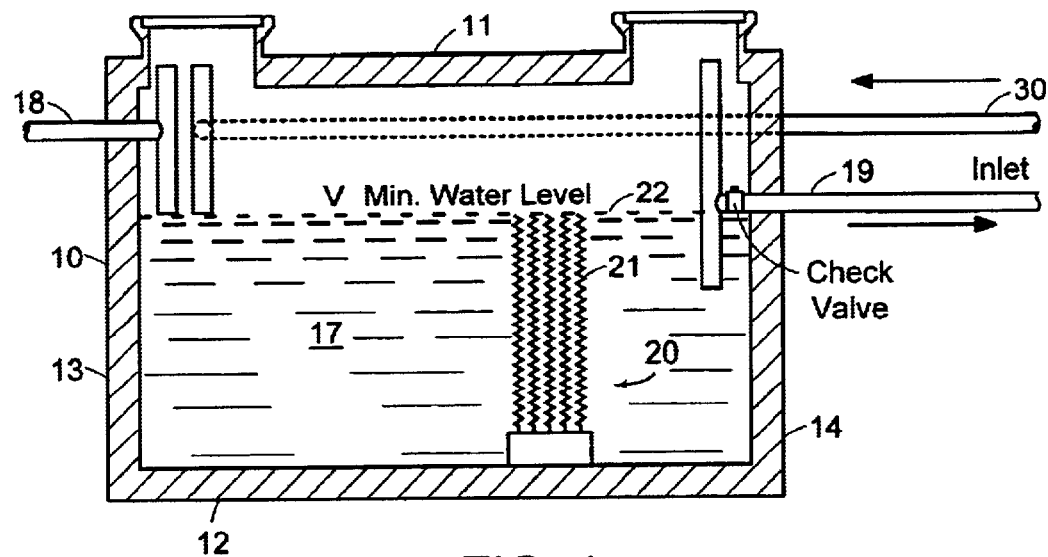
FIG. 1 is a diagrammic side view of a septic/anoxic tank constructed according to the invention.
Figure 2:
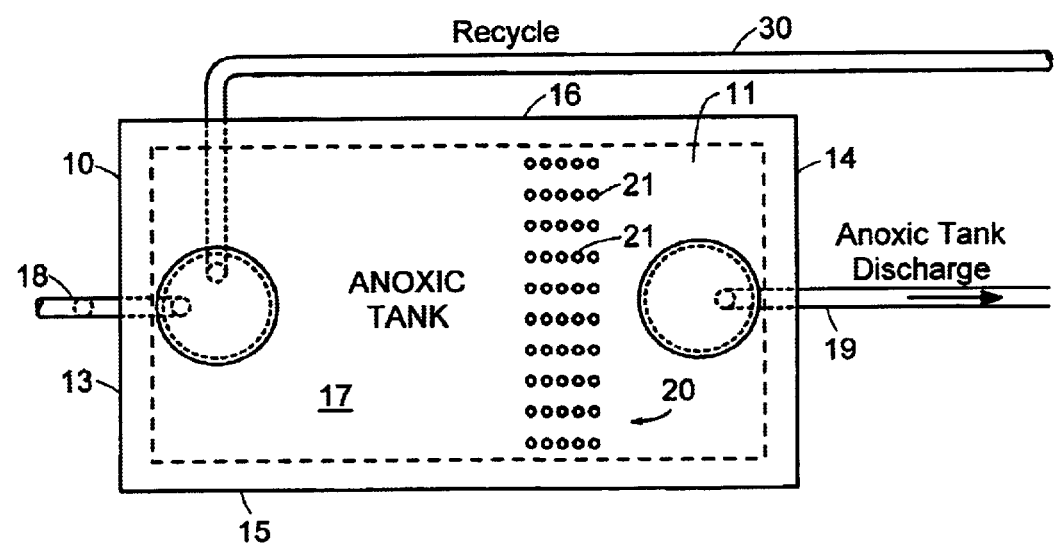
FIG. 2 is a top view of the tank of FIG. 1.

Referring to the drawings in detail wherein like elements are indicated by like numerals, there is shown a septic tank (anoxic) tank 10 having a top 11, bottom 12, receiving side 13, discharge side 14, front 15 and rear 16, said top 11, bottom 12, sides 13, 14, front 15 and rear 16, defining a tank interior 17. The tank interior receives waste from a building through a receiving waste pipe 18 protruding through the tank receiving side 13. The waste then separates into solids and effluent. The waste effluent flows out through a discharge pipe 19 protruding through the tank discharge side 14 into a secondary treatment means (not shown). The treated effluent output from the secondary treatment means is then recycled back into the tank 10 through a recycle pipe 30 protruding through the tank rear 16.

To enhance the denitrification process on the effluent, media 20 in the form of a plurality of synthetic cords 21, each with a specific gravity less than 1, i.e., the specific gravity of the effluent, are attached within the tank interior 17 to the tank bottom 12. In this embodiment of the invention, the cords 21 form a denitrification wall across the tank interior 17 extending from the tank bottom 12 up to an effluent surface level 22. The cords 21 are bunched to form a lateral denitrification wall extending from the tank rear 16 to front 15, and are positioned toward the tank discharge side 14. The invention media 20 provides an increased surface area for the attachment of denitrification bacteria.

It is understood that the above-described embodiment is merely illustrative of the application. Other embodiments may be readily devised by those skilled in the art which will embody the principles of the invention and fall within the spirit and scope thereof.

We claim:

1. In combination with a septic tank having a top, bottom, receiving side, discharge side, front and rear, said top, bottom, sides, front and rear, defining a tank interior, said septic tank interior receives waste from a receiving waste pipe protruding through the tank receiving side, said waste separating into solids and effluent, said waste effluent flowing out through a discharge pipe protruding through the tank discharge side into a secondary treatment means providing nitrification, said treated effluent output from the secondary treatment means being recycled back into the septic tank through a recycle pipe protruding through the tank rear, a denitrification media, comprising:

a plurality of synthetic cords, each cord having a specific gravity less than a specific gravity of the effluent, said cords each having two ends, one of which is attached within the septic tank interior to the tank bottom.

2. A denitrification media as recited in claim 1, wherein:

said plurality of cords form a denitrification wall across the tank interior extending from the tank bottom up to an effluent surface level.

3. A denitrification media as recited in claim 2, wherein:

the plurality of cords are bunched to form a lateral denitrification wall extending from the tank rear to front.

4. A denitrification media as recited in claim 3, wherein:

the plurality of cords are positioned toward the tank discharge side.

5. A septic system, comprising:

an anoxic tank having a top, bottom, receiving side, discharge side, front and rear, said top, bottom, sides, front and rear, defining a tank interior;

a receiving waste pipe protruding through the tank receiving side into said tank interior, said receiving waste pipe adapted to receive waste, said waste being separated into solids and effluent within said tank interior;

a discharge pipe protruding through the tank discharge side from the tank interior, said discharge pipe adapted to carry waste effluent out of the tank into a secondary treatment means providing nitrification;

a recycle pipe interconnecting the secondary treatment means with the tank interior through the tank rear;

a denitrification media comprised of a plurality of synthetic cords, each cord having a specific gravity less than a specific gravity of the effluent, said cords each having two ends, one of which is attached within the tank interior to the tank bottom.

6. A septic system as recited in claim 5, wherein:

said plurality of cords form a denitrification wall across the tank interior extending from the tank bottom up to an effluent surface level.

7. A septic system as recited in claim 6, wherein:

the plurality of cords are bunched to form a lateral denitrification wall extending from the tank rear to front.

8. A septic system as recited in claim 7, wherein:

the plurality of cords are positioned toward the tank discharge side.

9. A method of enhancing denitrification in a septic system, comprising the steps of:

providing an anoxic tank having a top, bottom, receiving side, discharge side, front and rear, said top, bottom, sides, front and rear, defining a tank interior;

providing a receiving waste pipe protruding through the tank receiving side into said tank interior, said receiving waste pipe adapted to receive waste, said waste being separated into solids and effluent within said tank interior;

providing a discharge pipe protruding through the tank discharge side from the tank interior, said discharge pipe adapted to carry waste effluent out of the tank into a secondary treatment means providing nitrification;

providing a recycle pipe interconnecting the secondary treatment means with the tank interior through the tank rear;

providing a denitrification media comprised of a plurality of synthetic cords, each cord having a specific gravity less than a specific gravity of the effluent, said cords each having two ends, one of which is attached within the tank interior to the tank bottom.

10. A method as recited in claim 9, further comprising the steps of:

forming said plurality of cords into a denitrification wall across the tank interior extending from the tank bottom up to an effluent surface level.

11. A method as recited in claim 10, further comprising the steps of:

bunching the plurality of cords to form a lateral denitrification wall extending from the tank rear to front.

12. A method as recited in claim 11, further comprising the steps of:

positioning the plurality of cords toward the tank discharge side.

* * * * *